(12) United States Patent
Waalkes et al.

(10) Patent No.: US 9,438,734 B2
(45) Date of Patent: Sep. 6, 2016

(54) SYSTEM AND METHOD FOR MANAGING A DYNAMIC CALL FLOW DURING AUTOMATED CALL PROCESSING

(75) Inventors: Adam Waalkes, Sammamish, WA (US); Alastair Sutherland, Seattle, WA (US); Gilad Odinak, Bellevue, WA (US); Haodong (Howard) Jiang, Issaquah, WA (US); Llance Kezner, Bellevue, WA (US)

(73) Assignee: Intellisist, Inc., Seattle, WA (US)

( * ) Notice: Subject to any disclaimer, the term of this patent is extended or adjusted under 35 U.S.C. 154(b) by 2059 days.

(21) Appl. No.: 11/893,552

(22) Filed: Aug. 15, 2007

(65) Prior Publication Data

US 2008/0043983 A1 Feb. 21, 2008

Related U.S. Application Data

(60) Provisional application No. 60/838,101, filed on Aug. 15, 2006.

(51) Int. Cl.
*H04M 3/00* (2006.01)
*H04M 3/523* (2006.01)

(52) U.S. Cl.
CPC ... *H04M 3/5232* (2013.01); *H04M 2203/2011* (2013.01)

(58) Field of Classification Search
CPC .............................. G10L 15/005; G10L 15/08
USPC .......... 379/265.1–265.7, 266.01–266.1, 309, 379/88.16, 88.25, 88.27, 265.01–265.07
See application file for complete search history.

(56) References Cited

U.S. PATENT DOCUMENTS

| | | | | |
|---|---|---|---|---|
| 5,854,832 A * | 12/1998 | Dezonno | ................... | 379/265.07 |
| 6,101,486 A * | 8/2000 | Roberts et al. | ............ | 705/14.66 |
| 6,173,266 B1 * | 1/2001 | Marx et al. | ................... | 704/270 |
| 6,298,324 B1 * | 10/2001 | Zuberec | ................ | G10L 15/19 704/251 |
| 6,408,066 B1 * | 6/2002 | Andruska et al. | ........ | 379/265.12 |
| 6,411,687 B1 * | 6/2002 | Bohacek et al. | ........... | 379/88.21 |
| 6,434,523 B1 * | 8/2002 | Monaco | ................ | G06F 17/274 704/243 |
| 6,724,864 B1 * | 4/2004 | Denenberg | ........ | H04M 3/42153 379/88.16 |
| 6,798,768 B1 * | 9/2004 | Gallick et al. | ................ | 370/352 |
| 6,804,346 B1 * | 10/2004 | Mewhinney | ............... | 379/265.1 |
| 7,023,984 B1 * | 4/2006 | Short et al. | ............... | 379/388.03 |
| 7,031,907 B1 * | 4/2006 | Passaretti | .............. | G10L 15/193 704/2 |
| 7,103,176 B2 * | 9/2006 | Rodriguez et al. | ...... | 379/392.01 |
| 7,486,785 B2 * | 2/2009 | Flores et al. | ............. | 379/265.02 |
| 7,724,888 B1 * | 5/2010 | Bush et al. | ............... | 379/221.01 |

(Continued)

FOREIGN PATENT DOCUMENTS

GB 2405553 3/2005

*Primary Examiner* — William Deane, Jr.
(74) *Attorney, Agent, or Firm* — Patrick J.S. Inouye; Krista A. Wittman (57) ABSTRACT

A system and method for managing a dynamic call flow during automated call processing is provided. Calls from a plurality of callers into a call center are accommodated through monitored call sessions. A call flow for each call session is managed. Caller characteristics of the caller and physical conditions in relation to the call are evaluated. Those caller characteristics and physical conditions, which are respectively unique among the callers and the calls, are identified. The call flow of each call session is dynamically adjusted by modifying parameters for one or more of the caller characteristics and physical conditions. The caller characteristics, physical conditions, and parameters are stored in a database.

16 Claims, 6 Drawing Sheets

(56) References Cited

U.S. PATENT DOCUMENTS

| | | | |
|---|---|---|---|
| 8,494,855 B1* | 7/2013 | Khosla | G10L 15/193 704/231 |
| 2002/0085690 A1* | 7/2002 | Davidson | H04M 1/6505 379/88.17 |
| 2003/0097294 A1* | 5/2003 | Gordon | 705/10 |
| 2003/0174830 A1 | 9/2003 | Boyer et al. | |
| 2003/0191639 A1* | 10/2003 | Mazza | G10L 15/183 704/231 |
| 2004/0073569 A1* | 4/2004 | Knott et al. | 707/104.1 |
| 2004/0107097 A1* | 6/2004 | Lenane | G10L 17/26 704/231 |
| 2004/0215453 A1* | 10/2004 | Orbach | G10L 15/005 704/231 |
| 2005/0254639 A1* | 11/2005 | Rodriguez et al. | 379/388.04 |
| 2006/0036433 A1* | 2/2006 | Davis et al. | 704/223 |
| 2006/0116119 A1* | 6/2006 | Benco et al. | 455/423 |
| 2009/0043576 A1* | 2/2009 | Miller et al. | 704/231 |
| 2010/0246800 A1* | 9/2010 | Geppert et al. | 379/265.09 |
| 2011/0206198 A1* | 8/2011 | Freedman et al. | 379/265.03 |
| 2012/0219126 A1* | 8/2012 | Odinak | H04M 3/51 379/88.14 |
| 2013/0325720 A1* | 12/2013 | Bennett et al. | 705/44 |

\* cited by examiner

BBMKK6OCJAUMG8T2CM

CALL TIME 00:01:35 — Transfer to Live Agent | Logout

Caller Profile Listen | Update — 56

- First Name: JON
- Last Name: CONNOR
- Zip Code: 87654
- Existing Customer?: no — ○ Yes ○ No

Address Listen | Update

- House No.: 8
- Street Name: 470th PL SE
- City: NORTH BEND
- State: WA

Contact Information

- Phone: [ ] Listen | Update
- Email: [ ] Listen | Update

Reason for Call Listen | Update order

○ Order – something
○ 1. Order – Superstars of Country
● 2. Order – The Best of Luther Vandross
○ 3. Order – 70s Music Explosion
○ 4. Order – ELV1S: 30 #1 Hits
○ 5. Order – Body and Soul
○ 6. Order – Lifetime of Romance
☐ Cancel Order
☐ Shipping
☐ Return
☐ Bad Product
☐ Others

Credit Card Listen | Update

- Type: Choose A Type
- Number:
- Exp date: /

SYSTEM AND METHOD FOR MANAGING A DYNAMIC CALL FLOW DURING AUTOMATED CALL PROCESSING

CROSS-REFERENCE TO RELATED APPLICATION

This non-provisional patent application claims priority under 35 U.S.C. §119(e) to U.S. provisional patent application Ser. No. 60/838,101, filed Aug. 15, 2006, the disclosure of which is incorporated by reference.

FIELD

The present invention relates in general to automated call center operation and, in particular, to a system and method for managing a dynamic call flow during automated call processing.

BACKGROUND

Customer call centers, or simply, "call centers," are often the first point of contact for customers seeking direct assistance from manufacturers and service vendors. Call centers are reachable by telephone, including data network-based telephone services, such as Voice-Over-Internet (VoIP), and provide customer support and problem resolution assistance. Although Worldwide Web- and email-based customer support are becoming increasingly available, call centers still offer a convenient and universally-accessible forum for customer assistance.

The timeliness and quality of service provided by call centers is critical to ensuring customer satisfaction, particularly where caller responses are generated through automation. Generally, the expectation level of callers is lower when they are aware that an automated system, rather than a live human agent, is providing assistance. However, customers become less tolerant of slow response times and complicated menus of options, which can result in caller confusion and delay. Minimizing delays is crucial, even when caller volume is high, and keeping the caller interface easily understandable and user friendly is paramount.

Presenting an effective caller interface that is able to meet caller expectations is a challenge. A "one size fits all" approach generally fails, as each particular caller has different physical and content provisioning needs. For example, some callers may be hard of hearing and require increased sound volume. Also, the degree of perceived comprehension can vary from user to user.

Taking a lowest common denominator approach also generally fails. Assuming, for instance, that every caller has hearing trouble or requires enunciated and detailed prompts will frustrate other callers, who have easily identified needs or are in a hurry.

Therefore, there is a need for providing a call center user interface that can be flexibly and dynamically personalized to best meet the individual needs of each caller.

SUMMARY

On-going caller sessions can be evaluated to determine caller attributes, which may be unique to the caller or physical conditions. Based on the evaluated caller attributes, the agent responsible for the call can dynamically adjust the call flow through an agent console. Various parameters can be modified to customize and better tailor the presentment of the call to the user.

A further embodiment is a system and method for managing a dynamic call flow during automated call processing. A call session of a caller is monitored. Caller attributes are evaluated in relation to the caller during the call session. Those caller attributes, which are unique to at least one of the caller and the call session, are identified. A flow of the call session is dynamically adjusted by modifying parameters corresponding to the unique caller attributes.

A still further embodiment is a system and method for managing a dynamic call flow during automated call processing. Calls from a plurality of callers into a call center are accommodated through monitored call sessions. A call flow for each call session is managed. Caller characteristics of the caller and physical conditions in relation to the call are evaluated. Those caller characteristics and physical conditions, which are respectively unique among the callers and the calls, are identified. The call flow of each call session is dynamically adjusted by modifying parameters for one or more of the caller characteristics and physical conditions. The caller characteristics, physical conditions, and parameters are stored in a database.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Automated Call Center Operational Environment

Figure 1:
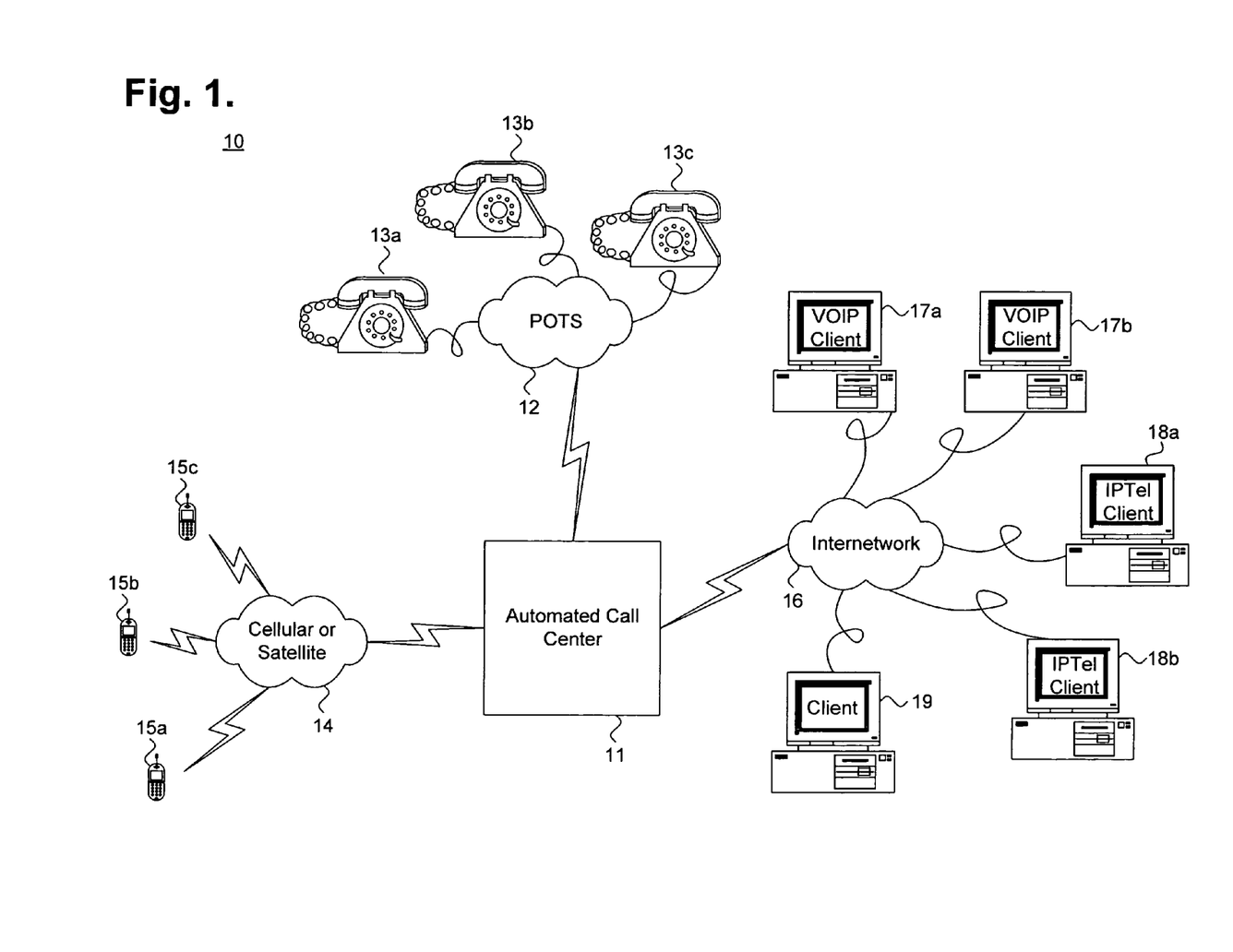
FIG. 1 is a functional block diagram showing an automated call center operational environment.

Automated call centers are a form of voice-response system, which rely upon programmed control to guide callers through a machine-generated dialogue for receiving support and problem resolution assistance. FIG. 1 is a functional block diagram showing an automated call center operational environment 10. By way of example, a multiplicity of callers call into an automated call center 11, generally through telephonic means, which can include conventional telephone handsets 13a-c through Plain Old Telephone Service (POTS) 12, portable handsets 15a-c through cellular and satellite telephone service 14, VoIP clients 17a-b, and Internet telephony clients 18a-b, as well as other forms and combinations of telephony, message, and voice-based communications. For example, a telephone caller may provide responses to the automated call center 11 through a combination of voice, dual-tone multi-frequency (DTMF), or text messaging. Callers can also "call" or interface into the automated call center 11 using conventional network clients 19 through an internetwork 17, including the Internet. Other types of automated call center access are possible.

Except as otherwise stated, as used herein, the terms "caller," "user," and "customer" are used interchangeably to refer to a caller to the automated call center 11. Similarly, the terms "agent," "guide," and "operator" are used interchangeably to refer to an agent that provides service provisioning to the caller for the automated call center 11. Additionally, although the automated call center 11 is shown as a single point within the automated call center operation environment 10, the automated call center 11 could include two or more logically interconnected but physically separate, including geographically removed, call center operations, which collectively provide a unified automated call center. Other automated call center arrangements and configurations are possible.

Automated Call Center

Figure 2:
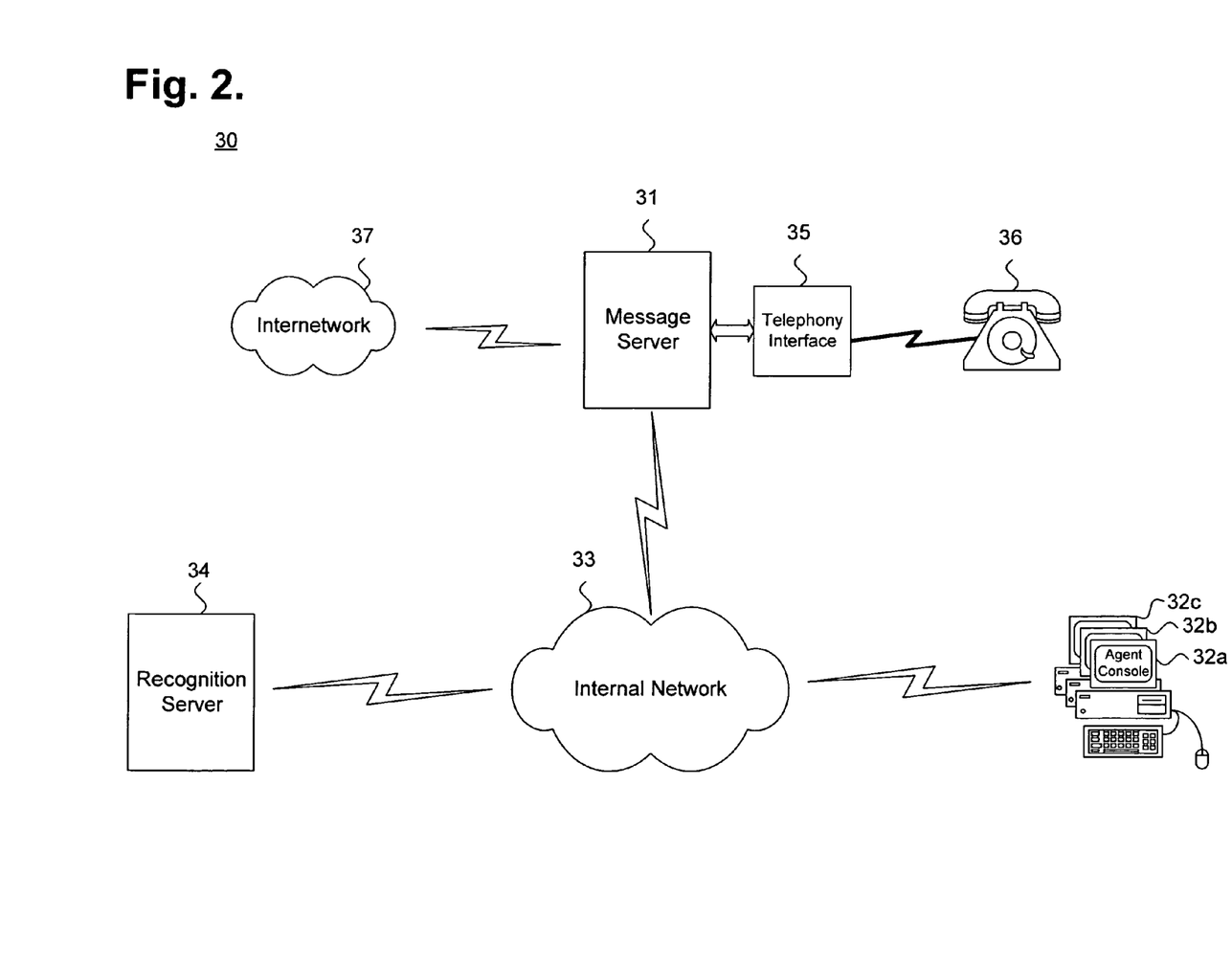
FIG. 2 is a functional block diagram showing an automated call center for use in the automated call center operational environment of FIG. 1.

Generally, an automated call center provides a single dial-in source for support and problem resolution assistance for customers seeking direct help from manufacturers and service vendors. However, automated call centers 11 can also be applied to many other diverse areas of commerce, such as mail order sales and roadside assistance dispatch. FIG. 2 is a functional block diagram showing an automated call center 30 for use in the automated call center operational environment 10 of FIG. 1. The automated call center 30 includes one or more servers 31, 34 and agent consoles 32a-c operatively interconnected over an internal network 33. The agent consoles 32a-c could also be interconnected to the message server 31 over an external network infrastructure 33, such as the Internet or a non-public enterprise data network. The network infrastructure 33 can be either wired or wireless and, in one embodiment, is implemented based on the Transmission Control Protocol/Internet Protocol (TCP/IP) network communications specification, although other types or combinations of networking implementations are possible. Similarly, other network topologies and arrangements are possible.

A message server 31 provides the primary message-based communications infrastructure for the call center operation, such as described in commonly-assigned U.S. Pat. No. 7,212,689, issued on Nov. 6, 2007, to Odinak et al., and U.S. Patent Application Publication No. 2005/0177368, published Aug. 11, 2005 to Odinak, the disclosures of which are incorporated by reference. During regular operation, the message server 31 executes multiple threads to process multiple simultaneous calls, which are handled by agents executing agent applications on agent consoles 32a-c.

Customer calls are received through a telephony interface 35, which is operatively coupled to the message server 31 to provide access to a telephone voice and data network 36. In one embodiment, the telephony interface connects to the telephone network 36 over a T-1 carrier line, which can provide individual channels of voice or data traffic. Other types of telephone network connections are possible.

The automated call center 30 also includes a recognition server 34, which interfaces directly to the message server 31 as a top-level or root tier of a speech recognition hierarchy. The message server 31 sends streamed audio data for each user call to the recognition server 34, which then performs distributed speech recognition. The message server 31 assigns grammar generation and speech recognition to the recognition server 34. Upon startup, the telephony gateway 35 opens a T-1 carrier device channel for each available T-1 time slot. The telephony gateway 35 initiates a new connection to the message server 31, one connection per T-1 device channel, and the message server 31, in turn, initiates a corresponding new connection to the recognition server 34.

The separate telephony gateway-to-message server and message server-to-main recognizer connections form one concurrent session apiece. When a customer call is answered or connected, the telephony gateway 35 sends a call message to the message server 31. The message server 31 then sends a new call message to the recognition server 34.

The message server 31 also assigns each new call to one of the agent consoles 32a-c through dynamic load balancing, such as further described in commonly-assigned U.S. Provisional Patent application, entitled "System and Method for Balancing Agent Console Load During Automated Call Processing," Ser. No. 60/838,074, filed Aug. 15, 2006, the disclosure of which is incorporated by reference. Each agent console 32a-c provides the primary means for direct customer interaction by providing service provisioning and related assistance to callers, such as further described below with reference to FIG. 3. The main purpose of each agent console 32a-c is to execute one or more agent applications, which display both user and agent messages and provide menus of actions that can be executed in response to agent commands, including script execution. One or more agent applications execute on each agent console and one or more agent consoles can execute in parallel. Alternatively, multiple instances of agent applications can run on a server machine and can be accessed by agents at agent consoles operating as remote terminals.

Each component, including the message server 31, recognition server 34, and agent consoles 32a-c, is implemented as a computer program, procedure or module, or state transition written as source code or flow specification in a conventional programming language, such as the C++ programming language or modeling tool, and presented for execution by a computer system as object or byte code. Alternatively, the components could be directly implemented in hardware, either as integrated circuitry or burned into read-only memory components. The various implementations of the source code and object and byte codes can be held on a computer-readable storage medium.

Exemplary Typical Call Sequence

Figure 3:
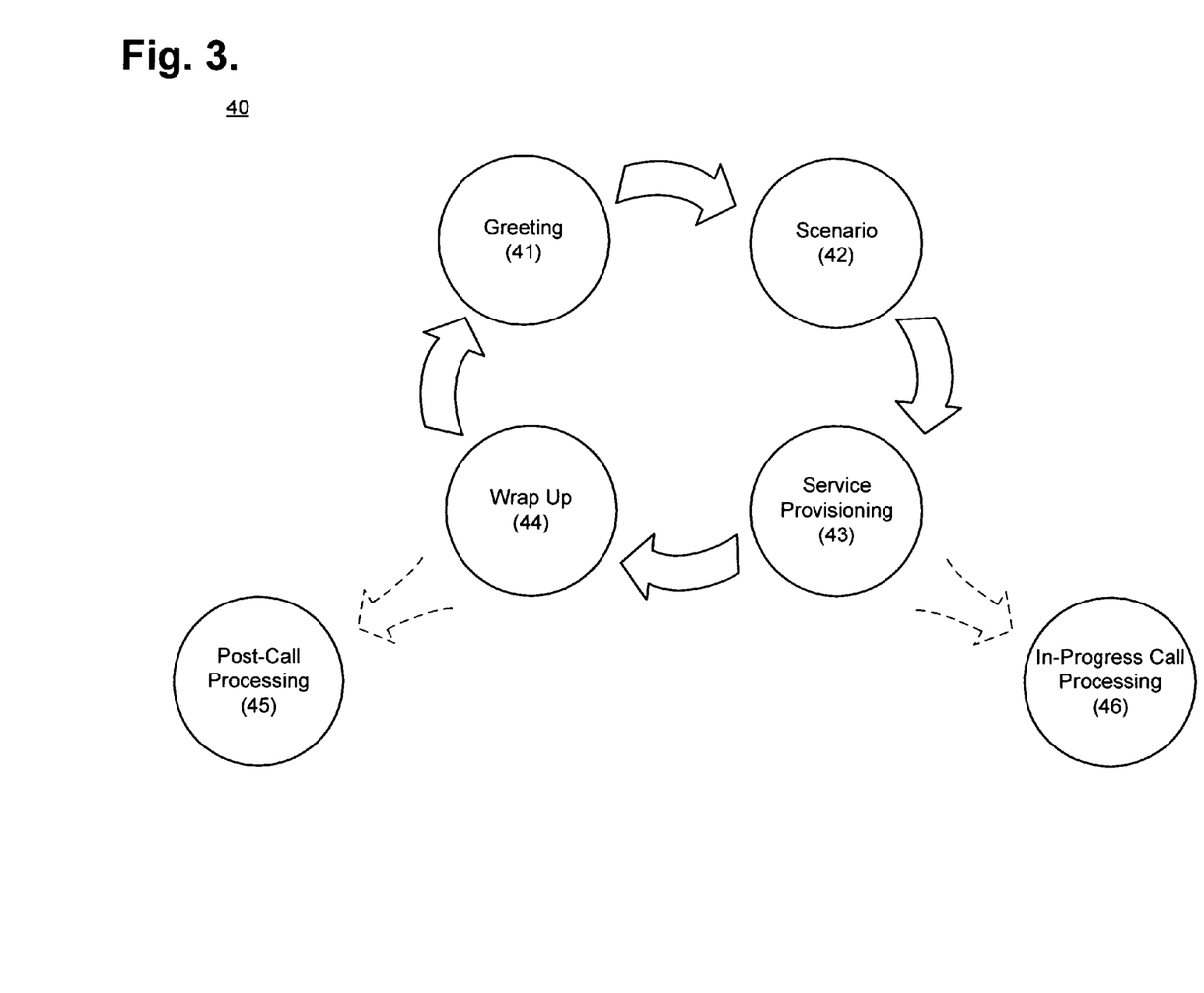
FIG. 3 is a process flow diagram showing, by way of example, a typical call sequence, as transacted by the automated call center of FIG. 2.

Callers to the automated call center interface indirectly with an agent, who multitasks through one or more individual caller sessions via an agent console 32a-c. The callers, however, only perceive an automated calling interface heard, for instance, through their telephone or portable handset. Calls are processed through a sequence of phases. FIG. 3 is a process flow diagram showing, by way of example, a typical call sequence 40, as transacted by the automated call center 30 of FIG. 2. Although the form of call processing required may vary by subject matter area and other factors, the same overall sequence of caller-to-agent interchanges will loosely apply.

Initially, upon calling into the automated call center 30, each user receives an initial greeting and optionally informational message 41 providing a synopsis of caller options. When provided, the caller options enable the user to navigate through to a specific topic area for assistance or support. However, the user could simply proceed directly into a customer support scenario 42 with either an agent, which is a live person; with a guide, which is an automated prompt that is under the supervision of a live person; or through automated voice response to enable information collection, problem trouble-shooting, and other actions. When present, the guide can listen to and revise caller replies in the background, generally unbeknownst to the caller, such as described in commonly-assigned U.S. Pat. No. 7,212,689, issued on Nov. 6, 2007, to Odinak et al., the disclosure of which is incorporated by reference. Other guide functions and caller dispositions are possible.

The scenario 42 can be delayed by agent unavailability, caller volume capacity limits, and other factors that can delay providing a response to the caller. Throughout the session, the agent can adjust and customize the flow of the call processing by evaluating caller attributes, such as described below beginning with reference to FIG. 5. In addition, the order in which information is gathered from the user to assist with problem resolution, such as identifying the caller's needs or troubleshooting a problem, can be dynamically evaluated and controlled, such as further described in commonly-assigned U.S. Provisional Patent application, entitled "System and Method for Processing Out-Of-Order Caller Responses During Automated Call Processing," Ser. No. 60/838,102, filed Aug. 15, 2006, the disclosure of which is incorporated by reference.

As required, service provisioning 43 is provided to the user, either directly during the course of the call or indirectly through a service request dispatch. The type of service provided can include sending information or products, entering a subscription or enrollment, or other forms of commerce or assistance that can be remotely provided over the telephone. Finally, the call ends in a wrap-up 44, which provides closure to the call and a departing salutation. Other forms and variations of customer call sequences are feasible. Importantly, however, from the perspective of the caller, the experience may appear to be an interaction with an intelligent machine and the caller would thus be aware that the agent is automated, not human. Accordingly, the caller would have a more relaxed expectation of agent responsiveness since a machine, and not an actual person, is on the line.

The automated call center 30 can perform in-progress call processing 46, which operates on a stream of speech utterances copied from on-going calls. As well, following call termination, the automated call center 30 can perform post-call processing 45, which identifies individual speech utterances in each call that can be analyzed or stored into a database 34. The identified speech utterances can be presented to an agent for manipulation, such as ranking or reordering. In addition, the post-call processing 45 can include performing speech recognition on the speech utterances, identifying speaker characteristics, and marking certain speech utterances for later use. In-progress 46 and post-call 45 processing can use the same types of operations, but in-progress call processing 46 allows an agent to perform real time call analysis.

Exemplary Agent Console

Figure 4:
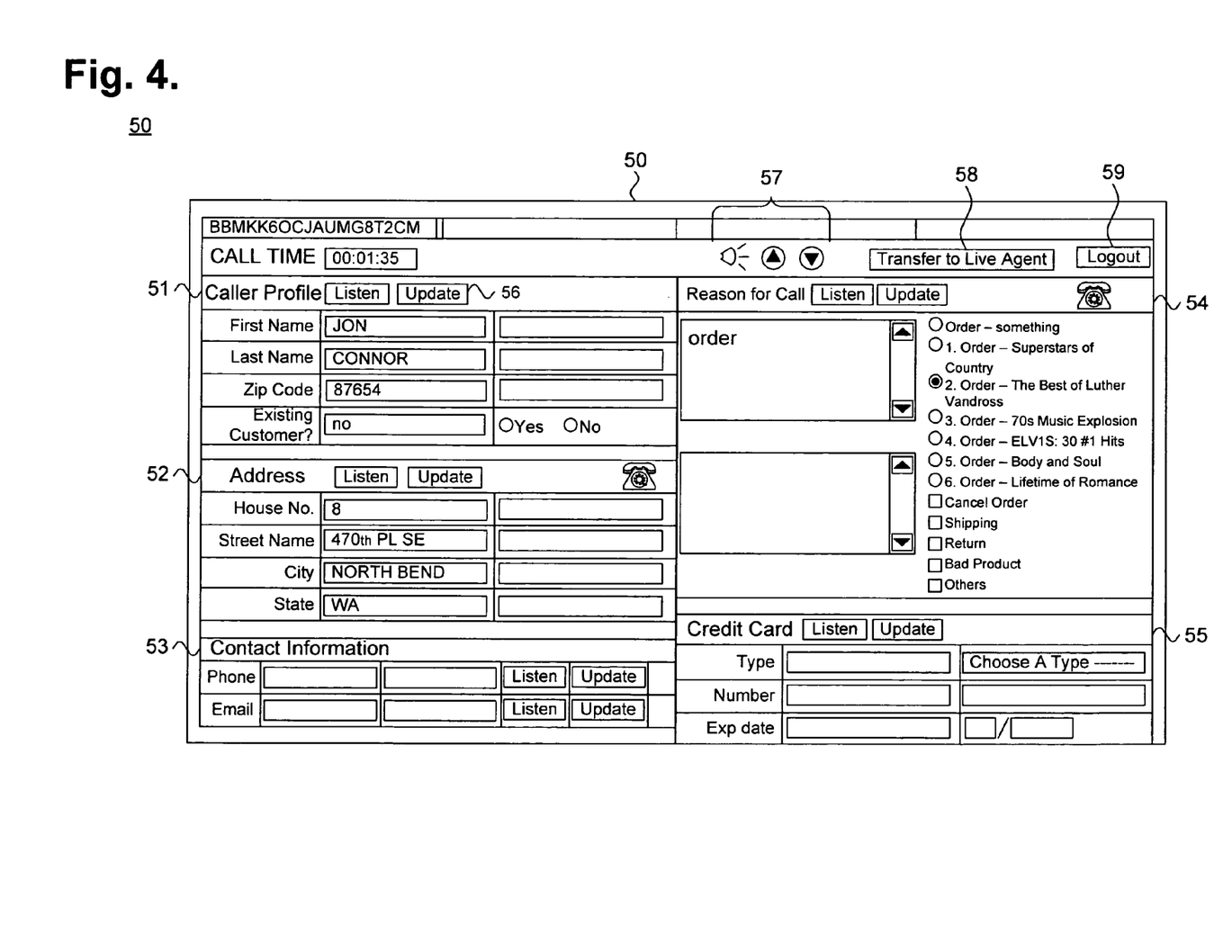
FIG. 4 is a screen diagram showing, by way of example, a view of an agent console for a live call session.

Call sessions are displayed on each agent console through a graphical user interface (GUI). FIG. 4 is a screen diagram showing, by way of example, a view of an agent console 50 for a live call session. Multiple call sessions can be simultaneously displayed and managed through the GUI controls.

The particulars concerning the live call session are obtained by the message server 31 and provided to the agent. The session particulars can include, for instance, caller profile 51, address 52, contact information 53, reason for call 54, and credit card data 55. Other types of session particulars are possible.

Operationally, the agent can review a recording of the caller's spoken responses through intuitive playback controls 57 and update the display by operating an "Update" control 56. Additionally, the agent can transfer the caller to a live agent by operating a "Transfer to Live Agent" control 58 and can log out by operating a "Logout" control 59. Other GUI controls are possible.

Dynamic Call Flow Management

Figure 5:
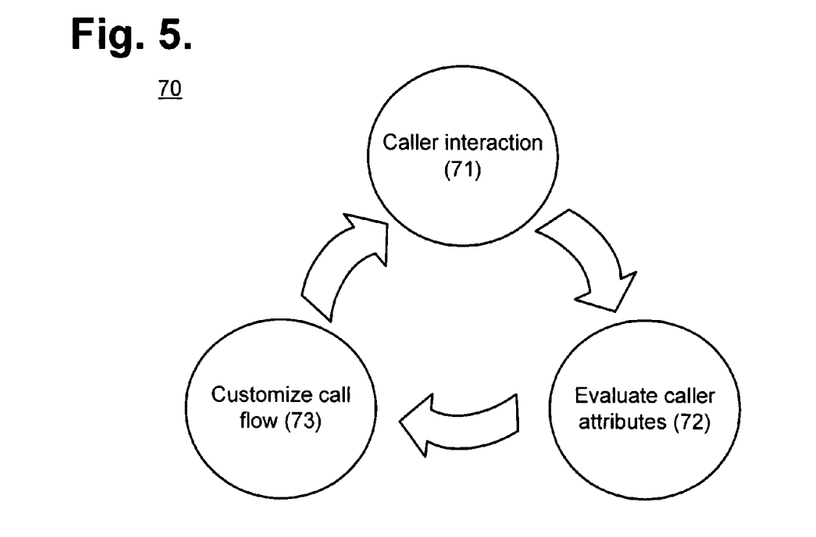
FIG. 5 is a process flow diagram showing a method for managing a dynamic call flow during automated call processing, in accordance with one embodiment.

Caller sessions can be dynamically customized by an agent through an agent console 32a-c at any point during a call. FIG. 5 is a process flow diagram showing a method 70 for managing a dynamic call flow during automated call processing, in accordance with one embodiment. Although a caller interface would ordinarily be modified or adjusted by the agent that is assigned to a call session, the caller interface could also be dynamically modified by another agent console or a server based on those caller attributes and conditions that are known. For example, the message server 31 may independently increase the sound volume for a caller through the telephony interface 35 if the message server 31 detects a significant degradation in line quality for that caller. Other types of dynamic caller interface changes are possible.

Generally, the caller and agent engage in interaction throughout the call session (operation 71), such as described above with reference to FIG. 3. Throughout the call session, the agent, with the assistance of the agent console 32a-c, will evaluate the attributes of the caller (operation 72) and can customize the flow of the call (operation 73), as further described below respectively with reference to FIGS. 6 and 7. Caller interaction, attribute evaluation, and call flow customization can continue to be performed repeatedly as needed throughout the session.

Caller Attributes

Figure 6:
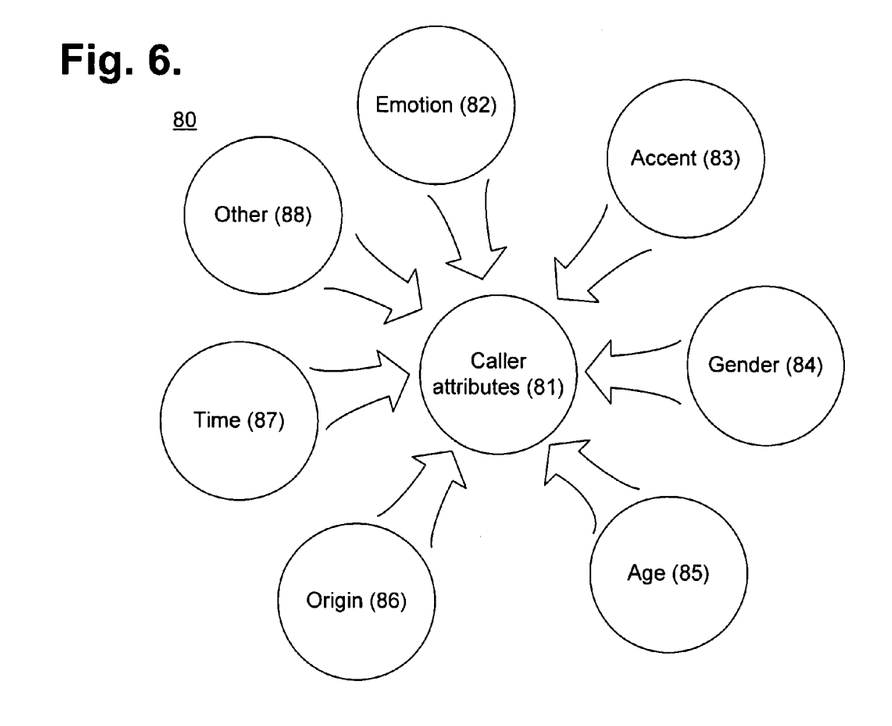
FIG. 6 is a block diagram showing, by way of example, caller attributes evaluated during dynamic call flow management.

Caller attributes depend upon both the caller and the physical characteristics of the call itself. FIG. 6 is a block diagram showing, by way of example, caller attributes 81 evaluated 80 during dynamic call flow management. Caller-specific attributes relate to perceived personal idiosyncrasies of the caller. Physical characteristics exist independently from the caller and are artifacts of both the physical medium and timing of the call.

Caller attributes 81 that relate to the specific caller include emotion 82, accent 83, gender 84, and age 85. Unless independently confirmed, for instance, through a questionnaire or database lookup, these caller attributes are perceived based on the subjective impressions of the agent or through automated analysis.

Physical caller-independent attributes 81 include origin of the call 86 and the time of the call 87. The caller origin 66 can be determined, for example, through area code or zip code lookup, and the time of the call 87 is available through automated timestamp. Other caller attributes 88 are possible.

Call Flow Parameters

Figure 7:
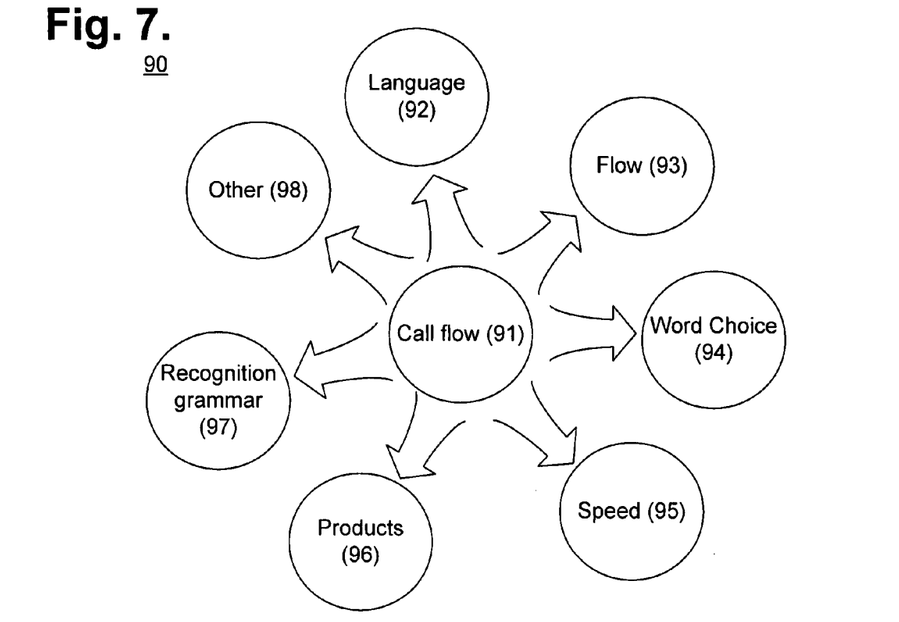
FIG. 7 is a block diagram showing, by way of example, call flow parameters customized during dynamic call flow management.

Based on the caller attributes evaluated, the caller interface can be customized dynamically to adjust the flow of the call to better meet the needs of the caller. FIG. 7 is a block diagram showing, by way of example, call flow parameters 91 customized 90 during dynamic call flow management.

Call flow can be adjusted either directly by the agent console 32a-c of the agent responsible for the call, or indirectly through another agent console or server.

The parameters adjustable to customize the call flow 91 include language 92, flow or detail level of the call 93, word choice 94, and speed 95. The content of the call can be further customized by tailoring those products that are recommended to the caller 96. Additionally, based primarily upon caller-specific attributes 81, the recognition grammar used 97 by the recognition server 34 (shown on FIG. 2) can be changed to better suit the caller's needs. Other call flow parameters 98 are possible.

Agent Console

Figure 8:
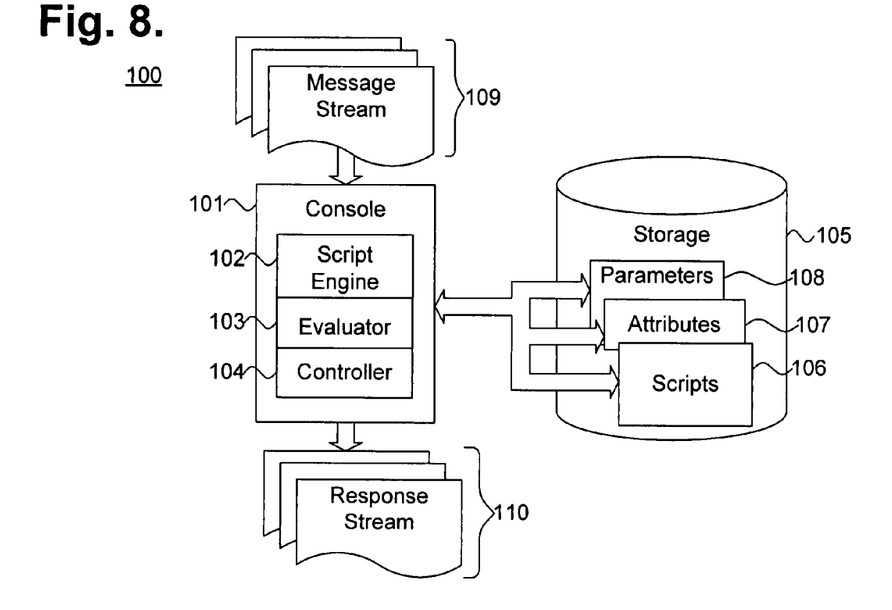
FIG. 8 is a block diagram showing a system for managing a dynamic call flow during automated call processing, in accordance with one embodiment.

Call flow is primarily controlled by the agent console 32a-c for the agent assigned to handling the call session. FIG. 8 is a block diagram showing a system 100 for managing a dynamic call flow during automated call processing, in accordance with one embodiment. The system 100 operates in accordance with a sequence of process steps, as described above with reference to FIG. 5.

Throughout the call session, the agent receives a stream of messages 109 and generates a stream of responses 100 through his or her agent console 101. The console 101 includes a script engine 102 that the agent can use to execute stored scripts 106 maintained in a storage device 105, which present "canned" interaction dialogues to the caller.

The console 101 also includes an evaluator 103 and controller 104. Throughout each session, the evaluator 103 parses and identifies caller attributes 107, which are stored into the storage device 105 and evaluated. Finally, the controller 104 suggests or automatically selects parameters 108 to dynamically adjust the call flow based on the evaluated attributes 107. The parameters 108 are also stored in the storage device 105. Other console functionality is possible.

While the invention has been particularly shown and described as referenced to the embodiments thereof, those skilled in the art will understand that the foregoing and other changes in form and detail may be made therein without departing from the spirit and scope of the invention.

What is claimed is:

1. A system for managing a dynamic call flow during automated call processing, comprising:
   a display to monitor by an agent, a call session of a caller; and
   a server to receive caller attributes subjectively determined by the agent, to evaluate the caller attributes in relation to the caller during the call session, to identify those caller attributes, which are unique to at least one of the caller and the call session, to adjust an interface of the caller by automatically selecting call flow parameters comprising at least one of language, detail level of the call, word choice, volume, and speed of the call, and customizing the selected call flow parameters by one of increasing and decreasing a level of one of the language, detail level of the call, word choice, volume, and speed of the call based on the unique caller attributes, and to change a recognition grammar for performing speech recognition based on the unique caller attributes.

2. A system according to claim 1, further comprising:
   a dynamic adjustment module to dynamically adjust the call session flow through at least one of a server and agent console.

3. A system according to claim 2, further comprising:
   a window to display the call session on the agent console; and
   an update module to maintain the agent console to provide user information to an agent.

4. A system according to claim 1, wherein the evaluator parses the caller attributes from the call session, further comprising:
   a selection module to select those call flow parameters most closely associated with the parsed caller attributes.

5. A method for managing a dynamic call flow during automated call processing, comprising:
   monitoring by an agent, a call session of a caller;
   receiving caller attributes subjectively determined by the agent;
   evaluating the caller attributes in relation to the caller during the call session;
   identifying those caller attributes, which are unique to at least one of the caller and the call session;
   adjusting an interface of the caller by automatically selecting call flow parameters comprising at least one of language, detail level of the call, word choice, volume, and speed of the call, and customizing the selected call flow parameters by one of increasing and decreasing a level of one of the language, detail level of the call, word choice, volume, and speed of the call based on the unique caller attributes; and
   changing a recognition grammar for performing speech recognition based on the unique caller attributes.

6. A method according to claim 5, further comprising:
   dynamically adjusting the call session flow through at least one of a server and agent console.

7. A method according to claim 6, further comprising:
   displaying the call session on the agent console; and
   maintaining the agent console to provide user information to an agent.

8. A method according to claim 5, further comprising:
   parsing the caller attributes from the call session; and
   selecting those call flow parameters most closely associated with the parsed caller attributes.

9. A system for managing a dynamic call flow during automated call processing, comprising:
   a recognition server to accommodate calls from a plurality of callers into a call center through monitored call sessions;
   an agent console to manage a call flow for each call session by receiving caller characteristics subjectively determined by an agent, evaluating the caller characteristics and physical conditions in relation to the call, identifying those caller characteristics and physical conditions, which are respectively unique among the callers and the calls, adjusting an interface of the caller by automatically selecting call flow parameters comprising at least one of language, detail level of the call, word choice, volume, and speed of the call, customizing the selected call flow parameters by one of increasing and decreasing a level of one of the language, detail level of the call, word choice, volume, and speed of the call based on one or more of the caller characteristics and physical conditions, and changing a recognition grammar for performing speech recognition based on at least one of the caller characteristics and physical attributes; and
   a database to store the caller characteristics, physical conditions, and call flow parameters in a database.

10. A system according to claim 9, wherein the caller characteristics comprise at least one of emotion, accent, gender, and age.

11. A system according to claim 9, wherein the physical conditions comprise at least one of a call origin and time.

12. A system according to claim 9, further comprising:
a call processor to process the call session at least one of during the call session and after the call session to identify speech utterances.

13. A method for managing a dynamic call flow during automated call processing, comprising:
accommodating calls from a plurality of callers into a call center through monitored call sessions;
managing a call flow for each call session, comprising:
receiving caller characteristics subjectively determined by an agent;
evaluating the caller characteristics and physical conditions in relation to the call;
identifying those caller characteristics and physical conditions, which are respectively unique among the callers and the calls; and
adjusting an interface of the caller by automatically selecting call flow parameters comprising at least one of language, detail level of the call, word choice, volume, and speed of the call, and customizing the selected call flow parameters by one of increasing and decreasing a level of one of the language, detail level of the call, word choice, volume, and speed of the call based on one or more of the caller characteristics and physical conditions;
changing a recognition grammar for performing speech recognition based on at least one of the caller characteristics and physical attributes; and
storing the caller characteristics, physical conditions, and call flow parameters in a database.

14. A method according to claim 13, wherein the caller characteristics comprise at least one of emotion, accent, gender, and age.

15. A method according to claim 13, wherein the physical conditions comprise at least one of a call origin and time.

16. A system according to claim 13, further comprising:
processing the call session at least one of during the call session and after the call session to identify speech utterances.

* * * * *